United States Patent [19]

Uehara et al.

[11] 4,332,706

[45] Jun. 1, 1982

[54] INTERNAL REFLECTION SUPPRESSING COATING MATERIAL FOR OPTICAL GLASS

[75] Inventors: Haruo Uehara; Kunio Satomi, both of Yokohama, Japan

[73] Assignee: Canon Kabushiki Kaisha, Tokyo, Japan

[21] Appl. No.: 149,456

[22] Filed: May 13, 1980

[30] Foreign Application Priority Data

May 21, 1979 [JP] Japan .................................. 54-62427
May 21, 1979 [JP] Japan .................................. 54-62428

[51] Int. Cl.³ ............................................. C08L 91/00
[52] U.S. Cl. ..................................... 523/450; 524/66; 524/113; 524/360
[58] Field of Search ............. 260/28 D, 28.5 AS, 28 R

[56] References Cited

U.S. PATENT DOCUMENTS 2,224,944 12/1949 Young ............................ 260/28.5 D
3,772,231 11/1973 Enomoto et al. ...................... 260/28
3,839,061 10/1974 Lehureau et al. ...................... 260/28
3,966,653 6/1976 Blunt et al. ............................ 260/28

OTHER PUBLICATIONS

Hunt, P. G., "Optical Cements-a laboratory assessment", *Optica Acta,* 1967, vol. 14, No. 4, pp. 401-435.
Photocopy of *Encyclopedia Britannica* (1981 ed.), "bitumen" entry.

*Primary Examiner*—Melvyn I. Marquis
*Attorney, Agent, or Firm*—Fitzpatrick, Cella, Harper & Scinto

[57] ABSTRACT

Internal reflection of an optical glass is suppressed by applying a coating material comprising a material selected from coal tar and coal tar pitch and a resin selected from vinylidene chloride series copolymers and halogenated epoxy resins.

10 Claims, 7 Drawing Figures

INTERNAL REFLECTION SUPPRESSING COATING MATERIAL FOR OPTICAL GLASS

BACKGROUND OF THE INVENTION

1. Field of the Invention

The present invention relates to a coating material for suppressing detrimental reflections of light by the internal surface in optical parts comprising optical glass such as lens, prism and the like.

2. Description of the Prior Art

Internal reflection of a lens is explained below by taking up a lens for a camera as an optical part. FIG. 1 shows schematically a cross sectional view of a lens for a camera. "a" denotes a lens barrel, "b" an aperture and "c" lenses.

When an external light 1 enters from the front side of the lenses, there occur irregular reflections as shown by lights 2, 3 and 4 since the peripheral surfaces of the lenses are roughly ground and there are relatively large unevenesses and the peripheral surfaces are in a form of frosted glass.

For example, light 2 proceeds toward the rear portion of the lens and forms ghost, or flare to lower the contrast of images. A reflection light follows light path 4 enters an observing eye in front of the camera and lowers remarkably the commercial value because the peripheral surface appears to be bright.

The "internal reflection of an optical glass" in question in this invention refers to the phenomenon that such reflection lights as 2, 3 and 4 are generated.

An internal reflection suppressing coating material is a black coating material applied to the peripheral surface, and the enlarged cross section is shown in FIG. 2. 1 denotes an external light and 5 denotes a reflection suppressing coating which absorbs the external light and prevents its reflection.

Heretofore, as the reflection suppressing coating material, there have been used black coatings, but the internal reflection suppressing ability is very unsatisfactory. For the purpose of sufficiently achieving this function, it is preferable that the refractive index of the coating is the same as that of the glass of the lens to be coated and the coating sufficiently densely contains a light absorbing material.

However, the refractive index of optical glasses widely ranges from less than 1.5 to over 1.8 while the refractive index of coating material ranges at most from 1.5 to 1.6 because components of the coating are organic materials. In particular, in case of glasses of a high refractive index the internal reflection suppressing coating of the prior art cannot sufficiently absorb the light incident thereto and the internal reflection does not decrease.

SUMMARY OF THE INVENTION

An object of the present invention is to provide an excellent internal reflection suppressing coating material for optical glass.

Another object of the present invention is to provide the coating material of a high refractive index or a coating containing densely a light absorbing material.

A further object of the present invention is to provide the coating material such that the spectral intensity of a slightly remaining internal reflection light is averaged in the visible light region.

Still another object of the present invention is to provide the inexpensive internal reflection suppressing coating material having excellent coating film physical properties such as mechanical strength, closely contacting property, hardness, durability, uniformity and the like.

A still further object of the present invention is to provide the coating material having a vehicle which is excellently miscible with coal tar and coal tar pitch.

According to the present invention, there is provided an internal reflection suppressing coating material for optical glass which comprises a material selected from the group consisting of coal tar and coal tar pitch and a resin selected from the group consisting of vinylidene chloride series copolymers and halogenated epoxy resins.

DESCRIPTION OF THE PREFERRED EMBODIMENTS

A group containing the present inventors has been researching the problem of suppressing internal reflection for many years.

Figure 3:
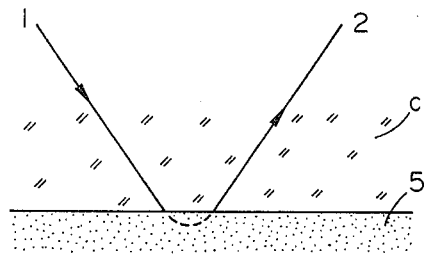
FIG. 3 schematically shows a reflection where leaking of light occurs.

The first countermeasure thought of is to absorb a light traveling in a coating (leaked light) from a viewpoint of physical optics. FIG. 3 shows schematically a state of reflection. Light 1 entering the interface between glass C and coating 5 from glass layer C reflects and returns to glass layer C according to geometrical optics and becomes an internal reflection. However, in such a case, a part of the light travels in the coating 5 as indicated by the dotted line and then becomes a reflection light 2. The depth of light leaked appears to be about one-fifth of the wavelength of the light in view of the distribution of light intensity. Therefore, if a light absorbing material is densely disposed within the range of the depth of light leaked, a reflection light is weakened because the leaked light is absorbed by said light absorbing material. In this method, as a light absorbing material, there are used dyes or pigments capable of being sufficiently dissolved in a vehicle and dispersed to the order of size of a molecule while in the prior art a material of a relatively large size such as carbon black is used as the light absorbing material. This method is disclosed in U.S. Pat. No. 4,004,851. This method can suppress the reflection even when the refractive index of the vehicle of a reflection suppressing coating material is not sufficiently high.

Another method is that a coating material of high refractive index, coal tar or coal tar pitch, is used. Since such materials are of poor mechanical strength, it is necessary to additionally incorporate an excellent vehicle component. Such vehicle should be of high refractive index and should be miscible with coal tar and coal tar pitch. This selection was very difficult, but copolymers of halogenated styrenes, polycyclic vinyl compounds and the like and polymers containing a heavy metal salt of an unsaturated aliphatic carboxylic acids were proposed (cf. West German Patent Publication, DAS, No. 2326057).

The present invention is based on the discovery of an appropriate vehicle component for the above mentioned second method.

Many components are necessary for an internal reflection suppressing coating to exhibit sufficiently its ability. Among them, a vehicle is one of the most important components as well as a light absorbing material. As mentioned above, it is desirable that the refractive index of an internal reflection suppressing coating is as high as that of the glass. Therefore, it is desired that all the components of the coating have a high refractive index, but this is practically difficult.

According to the present invention, it is the first feature that coal tar or coal tar pitch is selected as a vehicle and light absorbing material.

Coal tar and coal tar pitch have a very complicated composition. The main components are aromatic compounds, in particular, condensed polycyclic compounds such as anthracenes, naphthalenes, carbazoles, chrysenes, pyrenes, fluorenes and the like.

These compounds have a high refractive index of 1.8 or more, and moreover have a light absorbing property as to black color together with isolated carbon and coloring material components. In view of the foregoing, coal tar or coal tar pitch is very suitable for an internal reflection suppressing coating from the optical point of view, but is not always of a sufficient ability as a vehicle for a coating.

A vehicle for a coating usually contains a coloring material or a light absorbing material, and various fillers for improving the mechanical characteristics of the coating film, and it is required that a vehicle serves to give sufficient mechanical strength to the resulting coating film, close contacting property as to the member to be coated, and hardness and durability to the resulting coating film.

However, as is clear from the above mentioned components, coal tar and coal tar pitch are composed of low molecular weight components and therefore, the mechanical strength, heat resistance and the like are so low that a coating film having sufficient physical properties can not be obtained. As the result, it is necessary to blend a vehicle component having an excellent film shaping property with coal tar or coal tar pitch.

A property necessary for such vehicle component is that the refractive index be high and that the lowering of refractive index caused by coal tar or coal tar pitch be suppressed as far as possible. Another property necessary for such vehicle component is that the vehicle component can form a coating film which has a good close contact property, high mechanical strength, heat resistance, durability and the like.

In addition, the miscibility between the vehicle and coal tar or coal tar pitch is an important condition. If a vehicle which is less miscible with coal tar or coal tar pitch is blended with coal tar or coal tar pitch, the resulting coating causes gelation, separation, coagulation and the like so that it can not be a stable coating. When such coating is applied, and dried, the resulting coating film has an uneven surface and a sufficient film strength can not be obtained. Sometimes it happens that a uniform coating film can not be produced, and therefore, such a coating can not be used as an internal reflection suppressing coating.

As the result of the present inventor's research, it has been found that halogenated epoxy resins and vinylidene chloride series copolymers can be the satisfactory vehicle.

In general, halogenated epoxy resins, in particular, brominated epoxy resins are a kind of fire retardant resin, and have been used for potting of electric parts, soak-shaping, laminates and the like so as to impart fire-resistance to the articles.

However, to the best knowledge of the present inventors, such halogenated epoxy resins have not been used in a technical field where the optical property, in particular, the high refractive index, is utilized.

The present inventors have found that the halogenated epoxy resins are highly miscible with coal tar or coal tar pitch and the refractive index is relatively high and said resins are suitable for a vehicle for an internal reflection suppressing coating.

As the halogenated epoxy resins used in the present invention, there may be mentioned brominated epoxy resins, chlorinated epoxy resins and the like.

Commercially available brominated epoxy resins are, for example, Epikote CX-245, Epikote 1045-B-80, Epikote DX-248-B-80 (tradenames, supplied by Shell Chemicals Corporation), Epotohto YDB-340, Epotohto YDB-400, Epotohto YDB-500, Epotohto YDB-700, YDB-715 (tradenames supplied by Tohto Kasei Company, Japan), Epiclon 152, Epiclon 1120, Epiclon 163-60M, Epiclon 1120-80M, Epiclon 1125-75M (tradenames, supplied by Dainippon Ink And Chemicals, Incorporated), Dow Epoxy DER-511, DER-542, DER-580 (tradenames, supplied by Dow Chemical Co.) and the like.

As a curing agent for epoxy resins, there may be mentioned organic acids, acid anhydrides, amines, phenolic resins, urea resins, polyamide resins and the like.

In general, vinylidene chloride homopolymers are of relatively high crystallinity and their solubility is low, and therefore, the homopolymers are not so useful, but when vinylidene chloride is copolymerized with other vinyl compounds, the resulting copolymers are soluble in some solvents and thereby, can be used as a coating agent for a package material, a coating material base and the like. However, there has been no example where its high refractive index is positively utilized.

The present inventors have found that vinylidene chloride series copolymers, in particular, vinylidene chloride-vinyl ester (such as acrylic acid esters and the like) copolymers and vinylidene chloride-acrylonitrile copolymers, have a good miscibility with coal tar and coal tar pitch and a relatively high refractive index and are suitable for a vehicle for an internal reflection suppressing coating.

The lower the copolymerization ratio of a comonomer to vinylidene chloride, the higher the resulting refractive index, but the solubility is so low that the resulting copolymer can be used only with difficulty as a coating. Therefore, the copolymerization ratio of vinyl ester or acrylonitrile is preferably at least 2% by weight (i.e. vinylidene chloride being less than 98% by weight), but taking the resulting refractive index into consideration, the ratio is preferably less than about 20% by weight.

Examples of commercially available vinylidene chloride series copolymers are:

Aron CX-S-2 (tradename, vinylidene chloride-acrylic acid ester copolymer, supplied by Toa Gosei Chemical Industry Co. Ltd.), Saran F-310, F-216, R-200, R-202 (tradename, vinylidene chloride-acrylonitrile copolymer, supplied by Asahi-Dow Limited), and the like.

A further important component of the coating is a light absorbing material excluding coal tar and coal tar pitch.

In view of the mechanism of internal reflection suppression, it is preferable as mentioned above that a light absorbing material is finely dispersed as far as possible and densely incorporated in the light leaking layer. Coal tar or coal tar pitch is dissolved in a coating film in a size of the order of molecule where the coal tar or coal tar pitch is in the above mentioned vehicle. Therefore, coal tar and coal tar pitch becomes particles of several hundred Å or less in size. This particle size is far less than several microns-several tens microns which is the particle size of carbon black. Therefore, coal tar and coal tar pitch can exist sufficiently close to the reflection surface of light and can be within the depth of light leaked.

Further, it is possible to increase the concentration of a light absorbing material by dissolving in this coating composition another light absorbing material such as a dye capable of being sufficiently dissolved in an organic solvent and a film, for example, oil soluble dyes.

Coal tar and coal tar pitch can not be said to have sufficient characteristics as a perfect vehicle, but serve the function of a vehicle component, and therefore, can function as both a light absorbing material and a vehicle, and thereby, can increase the density of the light absorbing material to enhance the absorbing efficiency.

As mentioned above, the depth of light leaked is about one-fifth of the wavelength, and therefore, the depth of light leaked of a light of long wavelength is so long that the light of long wavelength is easily absorbed. As the result, the resulting reflection light contains light of shorter wavelength and it becomes bluish. Therefore, it is desirable that a light absorbing material incorporated in the internal reflection suppressing coating material contains a larger amount of a dye capable of absorbing a bluish light. For example, there may be used Oil Scarlet 308 (tradename, an oil soluble dye absorbing a bluish light, supplied by Orient Kagaku Co.), Oil Black HBB (black), Orasol Black (tradename, black, supplied by Ciba-Geigy A.G.), Neozapon Black RE (tradename, supplied by BASF) and the like.

These vehicles and the light absorbing material are dissolved in an organic solvent when used for a coating composition. The solvent should be miscible with the vehicle and should be able to dissolve sufficiently the light absorbing material such as dye.

Coal tar and coal tar pitch are relatively less soluble, and many kinds of polycyclic compounds precipitate upon dissolving or dilution. Therefore, it is not easy to use coal tar and coal tar pitch as a coating composition.

As a solvent for coal tar or coal tar pitch, there may be mentioned pyridine, chlorinated solvents such as methylene chloride and the like. Further, tetrahydrofuran, cyclohexanone and the like are also good solvents. It is recommended to select a solvent composition containing the above mentioned solvent as an indispensable component taking into consideration drying speed, cost, toxicity and the like of the coating composition.

Epoxy resins are soluble in relatively conventional solvents such as aromatic solvents, for example, toluene, xylene and ketone series solvents, for example, methyl ethyl ketone, and therefore, there is not a problem.

With respect to vinylidene chloride series resins, those of a low copolymerization ratio are of lower solubility and only a limited number of solvents such as tetrahydrofuran, cyclohexanone and the like can be used. On the contrary, vinylidene chloride series resins of a high copolymerization ratio such as more than several % are soluble in a mixture solvent containing the comonomer (not vinylidene chloride) as one component, for example, a mixture solvent of ketone series and a mixture solvent of ester series.

Figure 1:
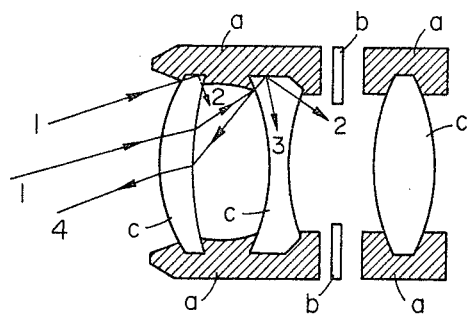
FIG. 1 schematically shows a cross section of a lens system of a camera for explaining an internal reflection.
Figure 2:
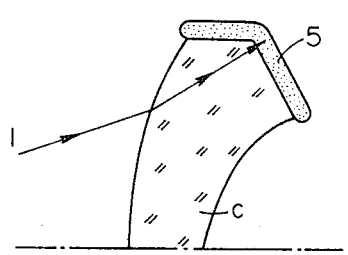
FIG. 2 shows an enlarged cross sectional view of a peripheral portion of a lens.

An internal reflection suppressing coating material is applied to a portion 5 as shown in FIG. 2 so as to suppress the reflection of light at the contacting surface between the lens and the spplied coating material. In view of such purpose of this coating material, the surface characteristics of this coating film are less important than those of ordinary coating materials. However, an internal reflection suppressing coating material is disposed inside of a lens barrel and therefore, sometimes the reflection of light at the surface is also a problem, and thus it is necessary to lessen the surface reflection as far as possible. This can be attained by mixing finely divided silica gel such as Aerosil (tradename, supplied by Nippon Aerosil Co. Ltd.) as a frosting agent to form fine unevenness on the surface of the coating film.

As other components for the coating material, there may be used a fungicide for preventing fungi from growing on the surface of lens and the internal surface of a barrel, a viscosity regulating agent, a body pigment and the like.

The contents of components (in solid form free from a solvent) of the coating material are preferably as shown below:

| | |
|---|---|
| halogenated expoxy resin or vinylidene chloride series copolymer | 10–45% by weight |
| coal tar or coal tar pitch | 15–70% by weight |
| light absorbing material | 3–40% by weight |

The present invention does not intend to restrict the process for preparing the coating material, and conventional processes for preparing usual coating materials can be used. That is, ball-mill, paint mill, atritor and the like can be used.

As to coating procedure, there may be used conventional coating procedures such as coating with a brush, roller coating, spray coating (for example, by means of a spray gun) and the like. Further, as in usual coating or coating procedure field, viscosity, content of solid matter, drying speed of solvents and the like should be somewhat adjusted depending upon the shape of article to be coated.

After applying the internal reflection suppressing coating material to a lens or after a further procedure, the surface of the lens should be cleaned. The cleaning may be effected by hand with a solvent such as alcohols, ethers and the like or by automatic cleaning such as supersonic cleaning with a surfactant or an organic solvent. It is not good if the internal reflection suppressing coating formed on the peripheral surface of a lens is dissolved in such treating liquid or peeled off during cleaning. A coating material of the present invention, in particular, a coating material of a type which uses an epoxy series resin as a vehicle and is sufficiently cured by using a curing agent, is not adversely affected by such cleaning in the post step.

The characteristics of the internal reflection suppressing coating film may be evaluated by an evaluating method usually used in the art of coating.

Among the various characteristics, the inventors have paid particular attention to viscosity, drying period of time, ratio of surface reflection, close contacting property of the coating film, hardness of the coating film, temperature resistance, humidity resistance, light resistance and the like. From the viewpoint of the original purpose, the ratio of internal spectral reflection is a very important parameter.

Figure 4A:
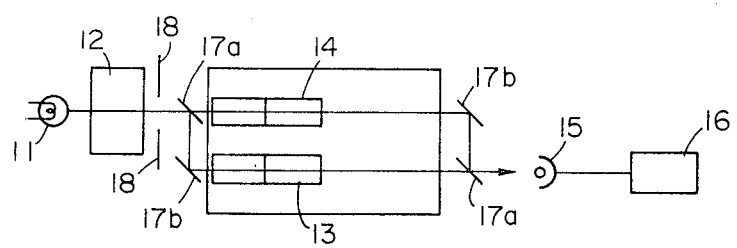
FIG. 4A and FIG. 4B schematically show a plane view and a front view of a Beckman Spectrophotometer for measuring the ratio of internal spectral reflection, respectively.

The evaluation of the ratio of internal spectral reflection used here is explained below referring to FIG. 4A and FIG. 4B, which show a plane view and a front view of a Beckman spectrophotometer for measuring the ratio of internal reflection, respectively. In the Figures, 11 denotes a light source, 12 a spectroscope, 13 a sample prism of a equilateral right-angled triangle shape having a sand blasted bottom surface and the bottom surface is coated with an internal reflection suppressing coating material 19. The bottom surface of a reference prism 14 is not coated. 15 denotes a detector, 16 a recorder, 17a a half-mirror, 17b a mirror, and 18 a slit.

The measurement is conducted by this apparatus as follows.

A light from the light source proceeds to enter and pass through the spectroscope. The resulting light is a monochromic light, which is then divided into two different paths by half-mirror 17a and enters the sample prism and the reference prism, respectively. Each reflection light is led to the detector by another half-mirror. A chopper mechanism (not shown) is used and a treatment by an electric system is applied to record on a recorder the ratio of intensity of the sample reflection light.

Figure 4B:
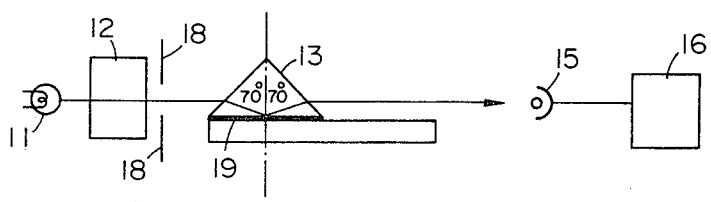

As shown in FIG. 4B, the light path is incident upon the coating surface at an angle of 70° to the normal line to the coating surface, and the light is detected by the detector.

The ratio of internal reflection is evaluated by a percentage of the intensity of reflection light from the coated surface to that of reflection light from non-coated surface as to lights of various wavelength.

The evaluation can be made by plotting the measured values on a graph having an abscissa corresponding to wavelength of the measured light and an ordinate corresponding to the ratio of internal reflection. For simplifying the numerical expression, an averaged value of the ratios of internal reflection for lights having wavelength of 410 nm, 450 nm, 500 nm, 555 nm, 600 nm, and 660 nm (average ratio of internal reflection) is employed.

The following examples are given for better understanding of the present invention.

EXAMPLES 1-4

In these Examples, halogenated epoxy resins were used. The ingredients listed in Table 1 excluding the curing agent were placed in a ball mill and mixed and dispersed for about 24 hours. The amount of the curing agent is shown in parts by weight per 100 parts by weight of the above mentioned ball-milled coating composition. The resulting coating composition was coated on a prism of an optical glass LAK-01 (refractive index of 1.64) in a way as mentioned above and the average ratio of internal reflection (%) was measured. The other characteristics of the coating films in Table 1 were measured as to samples obtained by applying the coating composition to a glass plate at room temperature, drying and then curing at about 80° C. for one hour. A cross-cut test was conducted by a cross-cut testing instrument and a scratch test was conducted by a scratch testing instrument, and the results were evaluated according to the evaluation standard of the Japanese Paint Inspecting Association and the ten point method.

Pencil hardness was measured by using a pencil hardness tester according to JIS-K-5400, General Testing Method For Paint.

The storage durability as a coating composition (containing a solvent) is measured by observing whether deterioration such as precipitation and separation of the components occurs during storage. When neither precipitation nor separation occurs, it is evaluated as "good".

Epikote 828 used in Comparison Example 1 is not an epoxy resin, but a halogenated epoxy resin. Aerosil R-972 is a viscosity regulating agent. Clay is a body pigment. Epikure 103 is a curing agent composed of an amine.

Figure 5:
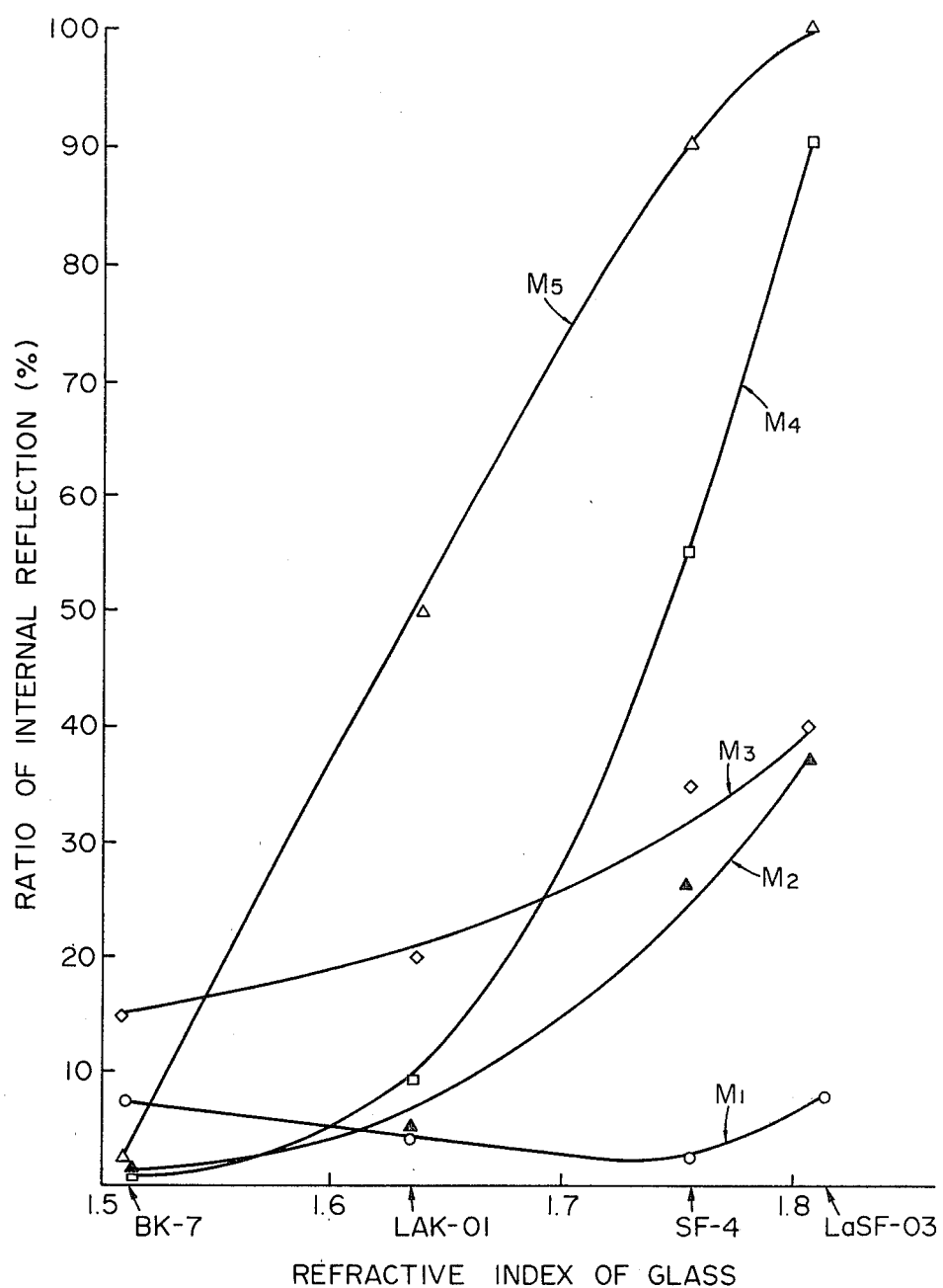
FIG. 5 and FIG. 6 are graphs showing the results of measurement of the ratio of internal reflection.

In FIG. 5, there is shown the results obtained by applying the coating composition of Example 3 and other commercially available black coating compositions to optical glass prisms of various refractive indexes and measuring the average ratio of spectral internal reflection.

In FIG. 5, $M_1$ denotes the coating composition of Example 3, $M_2$ a non-aqueous rapid drying black ink, $M_3$ a chinese ink, $M_4$ a commercially available black coating composition of epoxy resin series, and $M_5$ a commercially available black coating composition of acrylic resin series. Optical glasses used for measurement are BK-7 (refractive index of 1.52), LAK-01 (ibid. 1.64), SF-4 (ibid. 1.76) and LaSF-03 (ibid. 1.81).

As is clear from Table 1 and FIG. 5, the coating material according to the present invention exhibits excellent internal reflection suppression and excellent physical properties of a coating film.

TABLE 1

| | | Example 1 | Example 2 | Example 3 | Example 4 | Comparison Examples |
|---|---|---|---|---|---|---|
| Recipe | Coal tar | 25 | 25 | 30 | | |
| | Coal tar pitch | | | | 30 | 30 |
| | Epikote DX-245 | 25 | | | | |
| | Epikote DX-248-B-80 | | 30 | | | |
| | Epotohto YDB-400 | | | 30 | | |
| | Epotohto YDB-700 | | | | 25 | |
| | Epikote 828 | | | | | 30 |
| | Neozapon Black RE | 5 | 5 | 5 | 5 | 5 |
| | Orasol Blach 2RG | 5 | 5 | 5 | 5 | 5 |
| | Aerosil R-972 | 12 | 12 | 13 | 13 | 13 |

TABLE 1-continued

| | Examples and Comparison Example (weight ratio) | Example 1 | Example 2 | Example 3 | Example 4 | Comparison Examples |
|---|---|---|---|---|---|---|
| | Clay | 8 | 8 | 8 | 8 | 8 |
| | Toluene | 56 | 56 | 56 | 56 | 56 |
| | Methyl ethyl ketone | 24 | 24 | 24 | 24 | 24 |
| | Epikure 103 (curing agent) | 10 | 5 | 6 | 5 | 12 |
| Characteristics | Average ratio of internal reflection % | 4.2 | 3.8 | 5.0 | 4.5 | 12.0 |
| | Cross cut test | 10 | 10 | 10 | 10 | 10 |
| | Scratch test | 8 | 8 | 10 | 8 | 10 |
| | Pencil hardness test | H | H | H | H | H |
| | Storage durability as a coating composition | good | good | good | good | good |

EXAMPLES 5-9

The examples refer to vinylidene chloride series copolymers.

The compositions of Table 2 were placed in a ball mill and mixed and dispersed for about 24 hours to prepare coating compositions. In Table 2, Aron CX-S-2, S-lec C, and Ryuron QJ-1 were solutions containing 30-45% solid matter, and the other resins were in the form of solid powders.

The resulting coating composition was coated on a prism of an optical glass LAK-01 (refractive index of 1.64) in a way as mentioned above and the average ratio of internal reflection (%) was measured. The other characteristics of coating films in Table 1 were measured as to samples obtained by applying the coating composition to a glass plate at room temperature, drying and then curing at about 80° C. for one hour. A cross-cut test was conducted by a cross-cut testing instrument and a scratch test was conducted by a scratch testing instrument, and the results were evaluated according to the evaluation standard of the Japanese Paint Inspecting Association and the ten point method.

Pencil hardness was measured by using a pencil hardness tester according to JIS-K-5400, General Testing Method For Paint.

The storage durability as a coating composition (containing a solvent) is measured by observing whether deterioration such as precipitation and separation of the components occurs during storage. When neither precipitation nor separation occurs, it is evaluated as "good".

S-lec C used in the composition as a comparison example is a vinyl chloride-vinyl acetate copolymer manufactured by Sekisui Kagaku Co. (Japan). Ryuron QJ-1 is a vinyl chloride-vinyl propionate copolymer manufactured by Tekkosha Co. (Japan).

Figure 6:
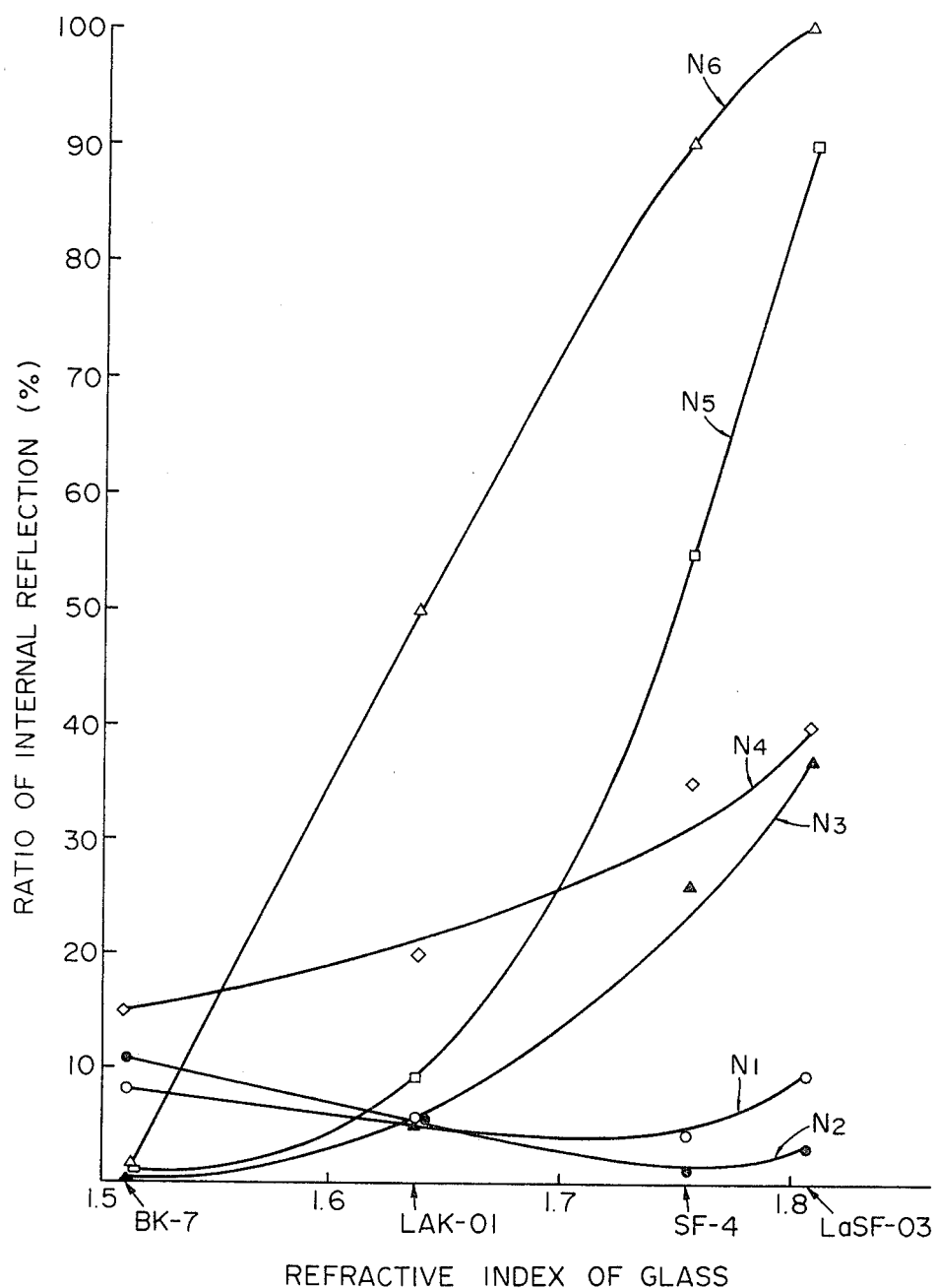

The coating composition in Example 7 or Example 8 and commercially available black coating compositions were applied to optical glasses having various refractive indexes, and the average ratios of spectral internal reflection were measured. The results are shown in FIG. 6. In said Figure, $N_1$ is the coating composition of Example 8, $N_2$ is the coating composition of Example 9, $N_3$ is a non-aqueous rapid drying black ink, $N_4$ is a chinese ink, $N_5$ is a commercially available black coating composition of epoxy resin series and $N_6$ is a commercially available black coating composition of acrylic resin series.

Optical glasses used for measuring are BK-7 (refractive index of 1.52), LAK-01 (ibid. 1.64), SF-4 (ibid. 1.76), and LaSF-03 (ibid. 1.81).

As is clear from Table 2 and Table 6, the coating material according to the present invention exhibits excellent internal reflection suppression and excellent physical properties of a coating film.

TABLE 2

| | | Examples and Comparison Examples | | | | | | |
|---|---|---|---|---|---|---|---|---|
| | | Example 5 | Example 6 | Example 7 | Example 8 | Example 9 | Comparision Example 2 | Comparison Example 3 |
| Recipe | Coal tar | 30 | 35 | 40 | | | 35 | |
| | Coal tar pitch | | | | 30 | 35 | | 40 |
| | Aron CX-S-2 | 55 | | | | | | |
| | Saran F-216 | | 27 | | | | | |
| | Saran R-200 | | | 25 | | | | |
| | Saran R-202 | | | | 27 | | | |
| | Saran F-310 | | | | | 27 | | |
| | Krehalon SOA | | | | | | | |
| | S-lec C | | | | | | 60 | |
| | Ryuron QJ-1 | | | | | | | 70 |
| | Aerosil R-972 | 4 | 5 | 5 | 6 | 4 | 5 | 6 |
| | Oil Black HBB | 7 | 7 | | | 7 | 7 | |
| | Oil Scarlet 308 | 4 | 4 | | | 4 | 4 | |
| | Orasol Black 2 RG | | | 6 | 7 | | | 7 |
| | Neozapon Black | | | 6 | 7 | | | 7 |
| | Tetrahydrofuran | | 30 | 30 | 40 | 30 | | |
| | Toluene | 180 | 80 | 80 | 80 | 80 | 90 | 90 |
| | Methyl ethyl ketone | 40 | | | | | 50 | 50 |
| | Ethyl acetate | | | | | | | |
| Characteristics | Average ratio of internal reflection % | 4.3 | 5.79 | 3.8 | 4.5 | 3.8 | 16.7 | 15.5 |
| | Cross cut test | 10 | 8 | 8 | 10 | 8 | 8 | 6 |
| | Scratch test | 10 | 8 | 10 | 10 | 10 | 4B | 8 |

TABLE 2-continued

| | Examples and Comparison Examples | | | | | | |
|---|---|---|---|---|---|---|---|
| | Example 5 | Example 6 | Example 7 | Example 8 | Example 9 | Comparision Example 2 | Comparison Example 3 |
| Pencil hardness test | HB | HB | F | HB | HB | F | HB |
| Storage durability as a coating composition | good | good | good | good | good | good | good |

What we claim is:

1. An internal reflection suppressing coating material for optical glass which comprises, as an admixture, a light absorbing material, a resin and an organic solvent, said light absorbing material being selected from the group consisting of coal tar and coal tar pitch and being present in an amount of 15 to 70 percent by weight of the coating material excluding the solvent, and said resin being selected from the group consisting of vinylidene chloride copolymers, brominated epoxy resins and chlorinated epoxy resins.

2. The coating material according to claim 1 in which the vinylidene chloride copolymers are copolymers of vinylidene chloride and vinyl esters.

3. The coating material according to claim 1 in which the vinylidene chloride copolymers are vinylidene chloride-acrylonitrile copolymers.

4. The coating material according to claim 1 in which the organic solvent is tetrahydrofuran or cyclohexanone.

5. The coating material according to claim 1 in which the halogenated epoxy resins are brominated epoxy resins.

6. The coating material according to claim 1 in which the coal tar or coal tor pitch is contained in an amount of 15-70% by weight based on the coating material.

7. The coating material according to claim 1 in which the halogenated epoxy resin or the vinylidene chloride copolymer is contained in an amount of 10-45% by weight based on the coating material excluding the solvent.

8. The coating material according to claim 1 which further comprises another light absorbing material which is a dye.

9. The coating material according to claim 8 in which the light absorbing material is a dye capable of absorbing a bluish light.

10. The coating material according to claim 8 in which the light absorbing material is contained in an amount of 3-40% by weight based on the coating material excluding the solvent.

* * * * *

UNITED STATES PATENT AND TRADEMARK OFFICE
CERTIFICATE OF CORRECTION

PATENT NO. : 4,332,706

DATED : June 1, 1982

INVENTOR(S) : HARUO UEHARA, ET AL.

It is certified that error appears in the above-identified patent and that said Letters Patent is hereby corrected as shown below:

Column 6, line 14, "spplied" should read --applied--.

In Table 1, at Column 7, line 65, the recipe element "Orasol Blach" should read --Orasol Black--.

In Table 1, at Column 8, line 60, the heading "Comparison Examples" should read --Comparison Example--.

Column 12, line 15, Claim 6, "tor" should read -- tar--.

Signed and Sealed this

Thirtieth Day of November 1982

[SEAL]

Attest:

GERALD J. MOSSINGHOFF

Attesting Officer — Commissioner of Patents and Trademarks